Feb. 14, 1933.  J. SUNNEN  1,897,774
WRIST PIN GAUGE
Filed May 31, 1930
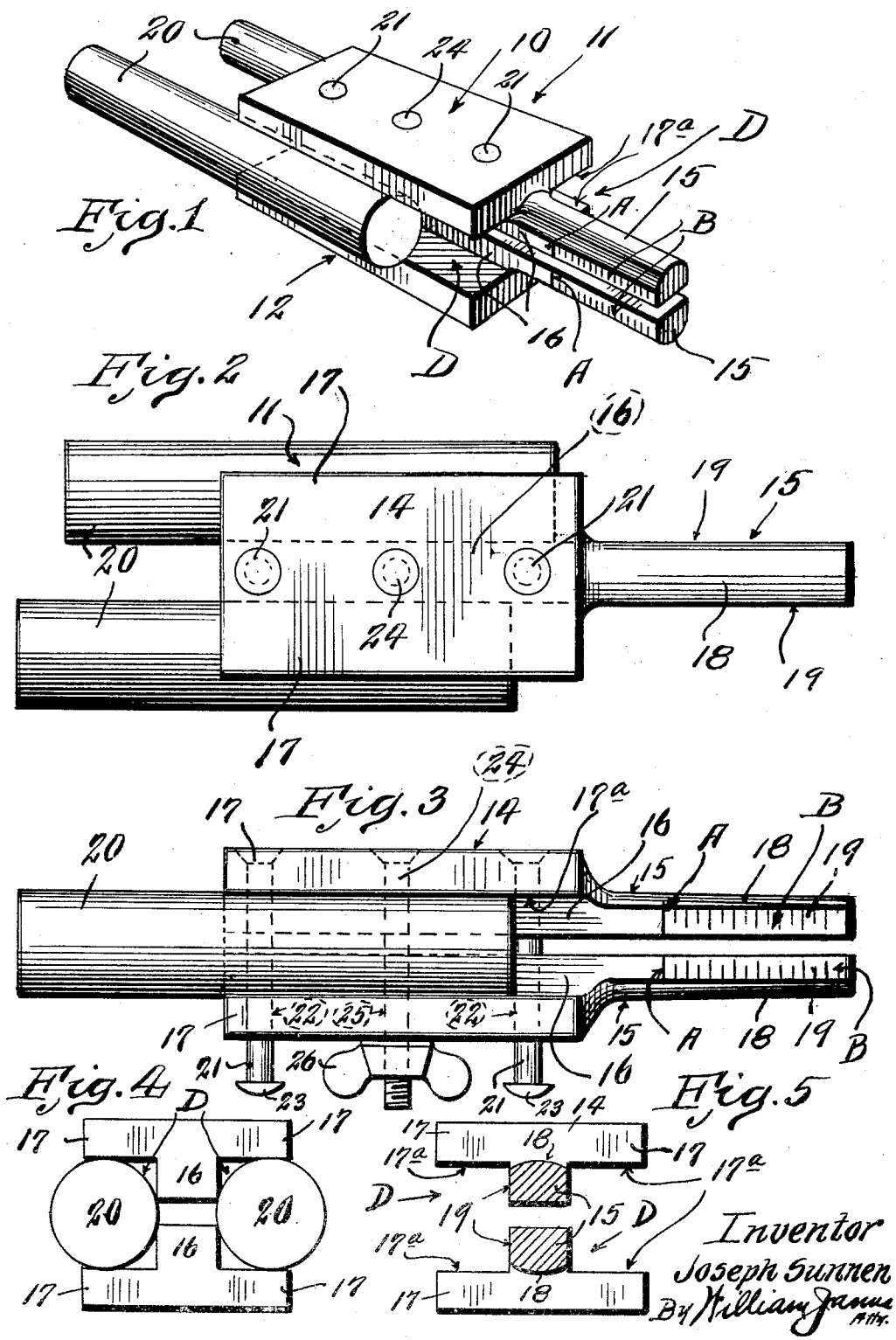
Inventor
Joseph Sunnen
By William James
Atty.

Patented Feb. 14, 1933

1,897,774

UNITED STATES PATENT OFFICE

JOSEPH SUNNEN, OF ST. LOUIS, MISSOURI

WRIST PIN GAUGE

Application filed May 31, 1930. Serial No. 458,393.

This invention relates to measuring instruments and more particularly to instruments for measuring apertures or bores, such as bearings for wrist pins and the like.
Heretofore in fitting wrist pins or other cylindrical bodies requiring a close fit in position, the customary procedure has been to hone or grind the bearing or aperture in stages and to try the pin after each honing or grinding operation until the pin fitted snugly within the bore. This trial method is tedious and expensive and is too uncertain. This is particularly true in fitting over size wrist pins in the pistons of internal combustion engines.

The objects of my invention are to provide a gauge by means of which the difference in size between the pin and the aperture or bearing can be readily ascertained and the extent of each grinding or honing operation, as well as the difference between the diameters of the pin and the bearing readily observed so that the grinding operation can be performed with accuracy and speed.

Further objects of the invention are to provide a gauge adapted to receive a pin, said gauge having a portion or extension insertable into the aperture designed to receive said pin, said insertable portion being expansible radially in exact relation to the diameter of said pin, whereby the exact diameter of said pin is to be found along the length of said insertable portion or extension and is distinctively marked thereon so that where the aperture or bore is of the exact size required to receive the pin said insertable portion can be inserted up to this mark.

Other objects of the invention are to provide a gauge for piston pins comprising two complementary sections adjustable laterally relatively to each other to clamp a wrist pin therebetween, said sections having reduced longitudinal extensions insertable into the wrist pin hole to gauge the size thereof and ascertain the extent of variation between said hole and the diameter of said wrist pin. Said extensions are tapered outwardly and are provided with suitable marks or graduations for measuring apertures of various sizes and are further provided with a main mark which indicates that at this particular point the diameter of said extensions is equal to the diameter of the wrist pin held by the gauge.

Still other objects of the invention are to provide a wrist pin gauge comprising two longitudinal sections adjustable laterally relatively to each other in parallel horizontal planes, said sections being provided with overhanging portions or flanges for clamping therebetween a wrist pin which it is desired to use and said sections being provided with longitudinal reduced extensions having transversely curved faces which taper outwardly and which are adapted to be inserted into the wrist pin bearing to indicate the diameter of said bearing as compared with the diameter of said wrist pin and to indicate whether said wrist pin bearing is of the exact diameter required for said wrist pin.

With these and other objects in view, my invention consists in certain novel features of construction and arrangement of parts, hereinafter more fully described and claimed, and illustrated in the accompanying drawing, in which—

Figure 1 is a perspective view of my gauge showing a wrist pin held thereby.

Figure 2 is a top plan view of same.

Figure 3 is a side elevational view of same.

Figure 4 is an end elevational view of one end of my gauge with the pins clamped in position.

Figure 5 is an end elevational view looking against the extension end thereof and showing said extensions in cross section.

Referring by numerals to the accompanying drawing, 10 indicates a wrist pin gauge comprising two longitudinal sections 11 and 12 which are identical in shape and size. Each section comprises a body portion 14 and a reduced longitudinal extension 15. Portion 14 is substantially T-shape in cross section having a central vertically disposed web or flange 16 and horizontally disposed flanges 17. Flanges 17 are of substantially greater depth than the corresponding flange 16. Thus when the two sections are assembled together with the central flanges 16 adjacent to each other the end of the gauge is in the shape of a large letter H resting on one side as clearly shown in Figure 4.

Each extension 15 is substantially of the same width as the width of flange 16 and is a continuation thereof. The upper face of each extension 15 is curved transversely as indicated at 18 and when said extensions occupy positions adjacent to each other, said curved faces 18 are concentric.

The sides of the extensions are flat as indicated at 19 and are each provided with a main mark or graduation A and with a series of auxiliary marks or graduations B. The curved faces 18 are slightly inclined from horizontal so that said extensions 15 taper longitudinally away from the body portions 14.

Thus the diameter of the curved faces 18 keeps gradually increasing toward the body portions 14 and at the point marked A said diameter is equal to the distance between the inner faces 17ª of flanges 17. When a wrist pin 20 is inserted in each seat or jaw D formed by cooperating flanges 17 of the two sections, the diameters taken along the various graduations B between mark A and the ends of extensions 15 are less than the diameter of said pin 20 but increase gradually until the diameter at said mark A is of the exact size as the diameter of wrist pin 20.

The two sections 11 and 12 are maintained in parallel horizontal planes with each other by means of pins 21 which are secured at one of their ends to one of the sections and extend vertically through apertures formed in the other section. In the present case pins 21 are secured to the body portion 14 of section 11 and extend transversely of the longitudinal axis and through the vertically disposed flange 16. The body portion 14 of section 12 is provided with similarly disposed apertures 22 through which said pins 21 extend a suitable distance beyond the apertured body portion 14.

Preferably the projecting ends of pins 21 are provided with heads 23 which prevent the detachment of the section 12 from position. The length of pins 21 is such that when the movable section 12 occupies its outermost position, said sections are capable of receiving a wrist pin of maximum diameter.

Pins 21 are preferably spaced longitudinally of each other near each end of the body portions 14. A screw 24 is secured at one end to the body portion 14 of section 11 substantially equidistant from pins 21 and extends parallel therewith through an aperture 25 formed in the body portion of section 12. The threaded end of said screw extends a suitable distance beyond section 12 and is adapted to receive a thumb screw nut 26, by means of which said sections can be drawn together.

To use the gauge, nut 26 is turned so as to permit the lateral separation of the two sections. A wrist pin which it is desired to place in position is then inserted in each jaw D. The nut 26 is then turned so as to force said sections together and securely clamp the wrist pins 20 between the horizontal flanges 17. When the wrist pins are thus clamped in position the distance between the curved faces 18 of extensions 15 along the mark A is exactly the same as the diameter of either one of said wrist pins, while the graduations from said mark A toward the ends of the extensions 15 indicate gradually decreasing diameters.

If it is desired to ascertain, before the grinding operation, the size of the wrist pin hole as compared with the wrist pin 20, the extensions 15 can be inserted into the wrist pin hole and one of the graduations B will indicate the size of the hole.

The wrist pin bearing or bore can now be operated upon by a honing or grinding operation and the gauge can be used to read, by means of extensions 18, the extent of such operation. When said extensions 15 are insertable into the bore up to the mark A the wrist pin bore is of the required size and the wrist pin 20 can be inserted in position. This can be done by reversing the position of the gauge so that the projecting end of wrist pin 20 can be placed in position, the body portions 14 of the sections serving as a suitable handle for this operation.

The two wrist pins 20 are of the same diameter so that the two sections 11 and 12 are in parallelism when said pins occupy seats D.

The pins when thus used space extensions 15 with accuracy and the diameter at mark A is exactly the same as the diameter of each pin. This insures a perfect fit and eliminates frequent measuring of the bore with precision instruments. Also expert knowledge of reading such instrument is obviated.

The gauge is of simple and rugged construction, can be readily used by unskilled mechanics, and is not injured nor is its accuracy impaired by rough handling.

While I have shown and described the gauge herein as used in fitting wrist pins for internal combustion engines, it is to be understood that the gauge can be equally as well used wherever it is desired to fit accurately a cylindrical object in its bearing.

Obviously various changes in the construction and arrangement of parts of my improved gauge can be made and substituted for those herein disclosed without departing from the spirit of my invention.

I claim:

1. A measuring instrument of the class described comprising a pair of complementary sections, each of which is provided with a flanged body portion and a reduced extension, the flanges of said body portions cooperating to form seats for clamping therein a pin and said extensions cooperating to form a tapering projection insertable into the bore designed to receive said pin whereby the diameter of said bore can be measured and compared with the diameter of said pin.

2. A measuring instrument of the class described, comprising a pair of complementary sections, each of which is provided with a flanged body portion and a reduced extension, the flanges of said body portions cooperating to form seats for clamping therein a pin and said extensions cooperating to form a tapering projection insertable into the bore designed to receive said pin to measure the diameter of said bore as compared to the diameter of said pin, said extensions being provided at predetermined points with suitable marks at which the diametrically opposed points are spaced the same distance apart as the distance between the opposed faces of the cooperating flanges of said body portions.

3. A measuring instrument of the class described comprising a pair of complementary sections, each of which is provided with a flanged body portion and a reduced longitudinal extension, the flanges of said body portions cooperating to form a seat for receiving and clamping in position a pin, said longitudinal extensions being provided with transversely curved peripheral faces tapering away from said body portions and provided on their sides with suitable marks, one of said marks indicating that the diametrically opposed points of the curved faces are spaced the same distance apart as the opposed faces of said cooperating flanges so that the diameter of the pin clamped between said flanges determines the distance between the diametrically opposed points at said mark.

4. A measuring instrument of the class described comprising a pair of complementary sections, each of which is provided with a flanged body portion and a reduced extension, the flanges of said body portions cooperating to form seats for clamping therein a pin and said extensions cooperating to form a tapering projection insertable into the bore designed to receive said pin whereby the diameter of said bore can be ascertained and compared with the diameter of said pin, and means for interengaging said sections and permitting adjusting movement laterally in parallel planes relatively to each other.

5. A measuring instrument of the class described, comprising a pair of cooperating sections, each of which is provided with a flanged body portion and a reduced extension, the flanges of said body portions cooperating to form seats for clamping therein a pin and said extensions cooperating to form a tapering projection insertable into the bore designed to receive said pin to measure the diameter of said bore as compared to the diameter of said pin, and a manually operable means for drawing said sections together and clamping said pins therebetween.

6. A device of the class described comprising two complementary sections between which is adapted to be clamped a pin, each of said sections having a longitudinal outwardly tapering extension, said extensions cooperating with each other and being insertable into an aperture designed to receive said pin, said sections being separable transversely to receive pins of various diameters, said extensions being provided with graduations to indicate various diameters, one of said graduations being arranged at a predetermined point, at which point the diameter is equivalent to the diameter of the pin clamped between said sections.

7. A device of the class described comprising two elongated complementary sections, each section having longitudinally and oppositely disposed flanges, the flanges of said sections cooperating to form seats for receiving and clamping therebetween wrist pins, each of said sections being provided with a longitudinal outwardly tapering extension, said extensions cooperating and being insertable into an aperture designed to receive said wrist pins, said extensions being provided with graduations to indicate the diameter of the aperture, one of said graduations being distinctively marked and being arranged at a point at which the diameter of the two extensions is equal to the diameter of the pin clamped between said sections.

8. A measuring instrument of the class described comprising a pair of elongated complementary sections separable laterally, said sections being provided with oppositely disposed seats for receiving and clamping therebetween a pin and being provided with tapering longitudinal extensions for inserting into the bore designed to receive said pin, whereby the diameters of said pin and said bore can be compared, said extensions being movable laterally in accordance with the diameter of the pin received between said sections.

9. A measuring instrument for wrist pin holes comprising a pair of cooperating sections, each of which is provided with a flanged body portion and a reduced extension, the flanges of said body portions cooperating to form seats for clamping therein a wrist pin and said extensions cooperating to form a tapering projection insertible into the wrist pin hole designed to receive said pin to measure the diameter of said hole as compared to the diameter of said pin, one of said body sections having a plurality of bores, and the other body section having a plurality of pins extending therefrom at right angles to the longitudinal axis thereof and traversing said bores for permitting relative movement of the sections in parallelism, and means for holding said sections together.

10. A calibrating instrument comprising two juxtaposed calipering members mounted in parallel spaced relation and relatively movable to vary said spacing, said members each having an extended tapered stem, said stems together comprising a pair of inside measuring calipers, and said members having opposed calipering elements comprising a pair of outside measuring calipers, one of said stems having graduations along its length, the graduations being proportional to the spacing of the opposed calipering elements.

11. A pin hole gauge comprising two juxtaposed pin holding elements mounted in parallel spaced relation and relatively movable to vary said spacing, said members each having an extended stem, said stems having opposite converging surfaces together comprising a pair of measuring calipers, and one of said stems having graduations along its length, the graduations being proportional to the spacing of the pin engaging surfaces of the holding elements.

12. A pin hole gauge comprising two juxtaposed pin receiving elements mounted in parallel spaced relation and relatively movable to vary said spacing for receiving pins of different diameters, said members each having an extended stem, said stems having opposite converging surfaces together comprising a pair of measuring calipers, the spacing of said converging surfaces at one point in their length being equal to the diameter of the pin determining the spacing of the pin receiving elements.

In testimony whereof I hereunto affix my signature this 27th day of May, 1930.

JOSEPH SUNNEN.